United States Patent
Eastman et al.

[11] Patent Number: 5,947,453
[45] Date of Patent: Sep. 7, 1999

[54] SPRING-MASS VIBRATION ABSORBER

[75] Inventors: Larry B. Eastman, Monroe; Anton Joseph Kompare, Hamden, both of Conn.

[73] Assignee: Sikorsky Aircraft Corporation, Stratford, Conn.

[21] Appl. No.: 08/768,446

[22] Filed: Dec. 18, 1996

[51] Int. Cl.$^6$ .................................. F16M 1/00; A61B 6/00
[52] U.S. Cl. ..................... 267/136; 244/17.11; 248/581; 248/629
[58] Field of Search .............................. 267/136, 140.11, 267/581, 592, 593, 595, 618, 629; 188/378–380; 244/17.11, 17.27

[56] References Cited

U.S. PATENT DOCUMENTS

| | | | |
|---|---|---|---|
| 3,836,098 | 9/1974 | Miyashita | 244/17.27 |
| 4,140,028 | 2/1979 | Desjardins | 244/17.27 |
| 4,230,291 | 10/1980 | Marshall | 244/17.11 |
| 5,118,051 | 6/1992 | Sheehy | 244/17.11 |
| 5,315,890 | 5/1994 | Lang | 267/158 |
| 5,529,277 | 6/1996 | Ostaszewski | 267/158 |

*Primary Examiner*—Robert J. Oberleitner
*Assistant Examiner*—Chris Schwartz
*Attorney, Agent, or Firm*—Adam C. Solomon

[57] ABSTRACT

A spring-mass vibration absorber for absorbing vibration in a structure. The vibration absorber comprising a baseplate having a first surface and a second surface, and a plurality of recurved springs connecting the baseplate to the structure. Each of the recurved springs is fixedly connected to the first surface of the baseplate at a baseplate connection point, and fixedly connected to the structure at a structure connection point.

19 Claims, 8 Drawing Sheets

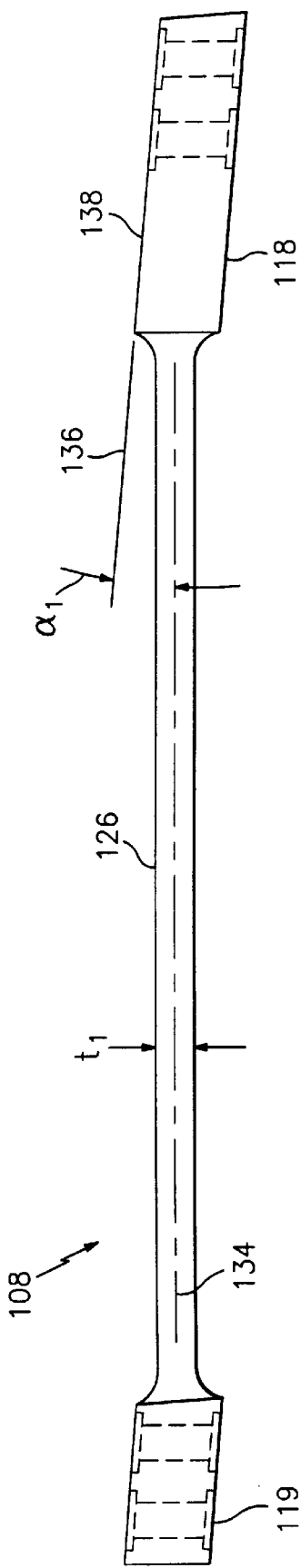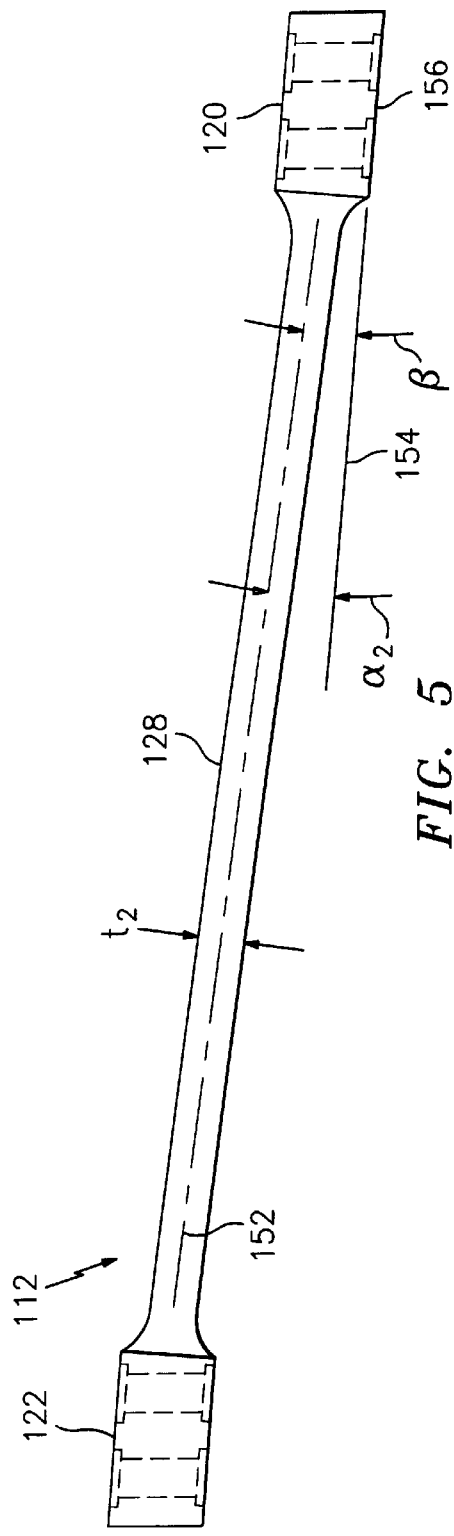

SPRING-MASS VIBRATION ABSORBER

TECHNICAL FIELD

This invention relates generally to spring-mass vibration absorbers for absorbing vibration in structures, and more particularly, to a spring-mass vibration absorber that provides a mass connected to a structure with a plurality of recurved springs.

BACKGROUND ART

During normal operation of a rotorcraft having a plurality of rotor blades connected to a rotor hub, the revolving rotor blades experience aerodynamic asymmetries which subject the rotor blades to alternating loads. These alternating loads impose a forcing frequency onto the rotor hub and rotorcraft structure, defined as a function of the number of rotor blades and their rotational speed, thereby causing the rotorcraft structure to vibrate at substantially the same frequency.

Since this rotor-induced vibration typically occurs at a constant frequency, a passive resonant-type vibration absorber is frequently utilized to generate opposing vibratory loads in the rotorcraft structure. Such an absorber is typically a single degree-of-freedom mass-spring system, attached to the rotorcraft's structure at a specific location, and designed to vibrate at its natural frequency in response to the rotor-induced vibration in the structure. When the rotorcraft structure causes the absorber to vibrate at its natural frequency, the reaction forces exerted by the absorber on the structure are out-of-phase with the vibratory forces experienced by the structure. Therefore, the vibration of the absorber has the effect of reducing the amplitude of the rotor-induced vibration at the point of connection between the absorber and the rotorcraft structure.

In U.S. Pat. No. 4,230,291, assigned to United Technologies Corp. (hereinafter "'291 patent"), a tuned spring-mass vibration absorber is disclosed for use in a rotorcraft. The vibration absorber in the '291 patent comprises a plurality of cantilevered leaf springs integrally connecting a dynamic mass to a vibrating support member. The leaf springs are connected to the dynamic mass at selected stations such that the mass center of gravity and the spring center of force are coincident. The leaf springs are shaped such that they constitute a substantial part of the vibration absorber effective mass, and are pivotally connected to the support member so as not to impart any moments thereto.

The pivotal connections between the leaf springs and the support member are achieved through the use of spherical bearing members in combination with bolts, wherein this combination transfers vertical, lateral, and longitudinal shear forces from the leaf springs to the support member, but does not impose moments on the support member. A drawback to the vibration absorber disclosed in the '291 patent is that mislocation of the spherical bearing members can alter the boundary conditions of the vibration absorber, thereby decreasing the ability of the vibration absorber to properly absorb vibration.

Specifically, mislocation of the spherical bearing members, which can occur during initial installation of the vibration absorber, can induce radial and axial steady loads in the bearings, thereby increasing rotational resistance and changing the vibration absorber's natural frequency. This change in the natural frequency makes tuning of the vibration absorber dependent upon the installation conditions associated with individual rotorcraft. This rotorcraft dependence necessitates a dynamic re-tuning of the vibration absorber during operation of the rotorcraft such that the natural frequency of the vibration absorber equals the anticipated rotor-induced vibratory frequency. In addition, the bearing loads induced by mislocated spherical bearing members can be relieved over time due to frictional wear in the spherical bearing members, thereby once again causing a change in the vibration absorber's natural frequency and necessitating dynamic re-tuning.

In order to tune a typical spring-mass vibration absorber (such as the one disclosed in the '291 patent) to the proper natural frequency, a stack-up of heavy and light tuning weights are connected to the underside of the dynamic mass, thereby increasing the total weight of the dynamic mass. Among the drawbacks to tuning a vibration absorber in this way is that in a typical installation setting for a vibration absorber, the structural design of the rotorcraft can present limitations as to the operational envelope of the vibration absorber. Specifically, during operation of the vibration absorber, a stack of multiple heavy and light tuning weights, in series, on the underside of the dynamic mass can cause contact between the tuning weights and nearby rotorcraft structure. In addition, since the tuning weights are stacked in series, it becomes more difficult to access any light or heavy tuning weights disposed distal from the bottom end of the stack.

DISCLOSURE OF THE INVENTION

It is therefore an object of the present invention to provide a spring-mass vibration absorber which provides a bearingless connection between the vibration absorber and a vibrating structure, thereby not exposing the vibration absorber to substantial variations in its natural frequency due to the imposition of radial and axial steady loads at the connection points between the vibration absorber and the vibrating structure.

This and other objects are achieved in the present invention, by a spring-mass vibration absorber for absorbing vibration in a structure, comprising a baseplate having a first surface and a second surface, and a plurality of recurved springs connecting the baseplate to the structure, wherein each of the recurved springs is fixedly connected to the first surface of the baseplate at a baseplate connection point, and fixedly connected to the structure at a structure connection point.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of modifications in various respects, all without departing from the invention. Accordingly, the drawings and description are to be regarded as illustrative in nature, and not as restrictive.

BRIEF DESCRIPTION OF THE DRAWINGS

FIG. 4 is a side view of the first spring element depicted in FIG. 1;

FIG. 5 is a side view of the second spring element depicted in FIG. 1;

BEST MODE FOR CARRYING OUT THE INVENTION

Figure 1:
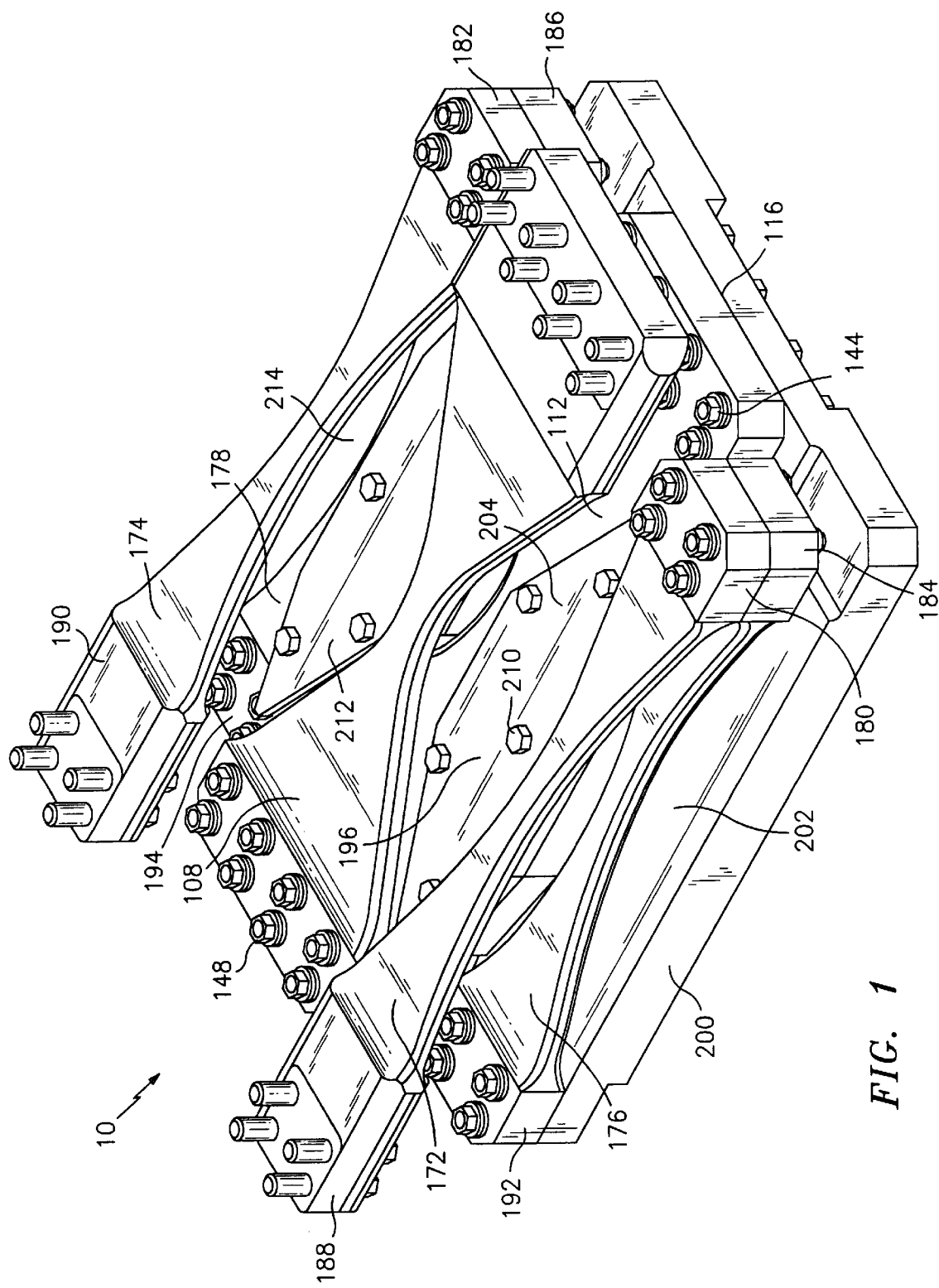
FIG. 1 is an isolated perspective view of a spring-mass vibration absorber embodying features of the present invention.
Figure 2:
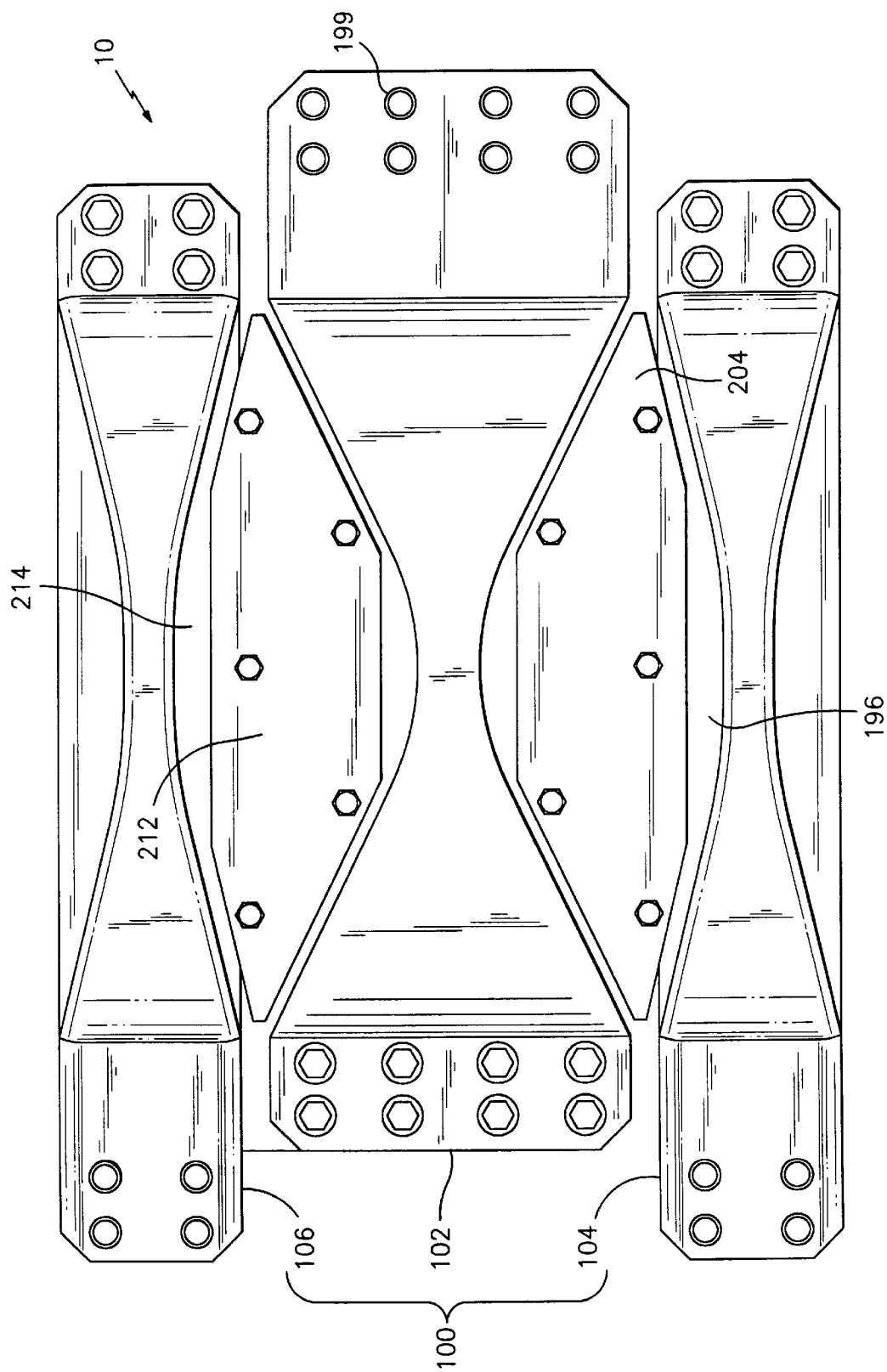
FIG. 2 is a top view of the spring-mass vibration absorber of FIG. 1.
Figure 3:
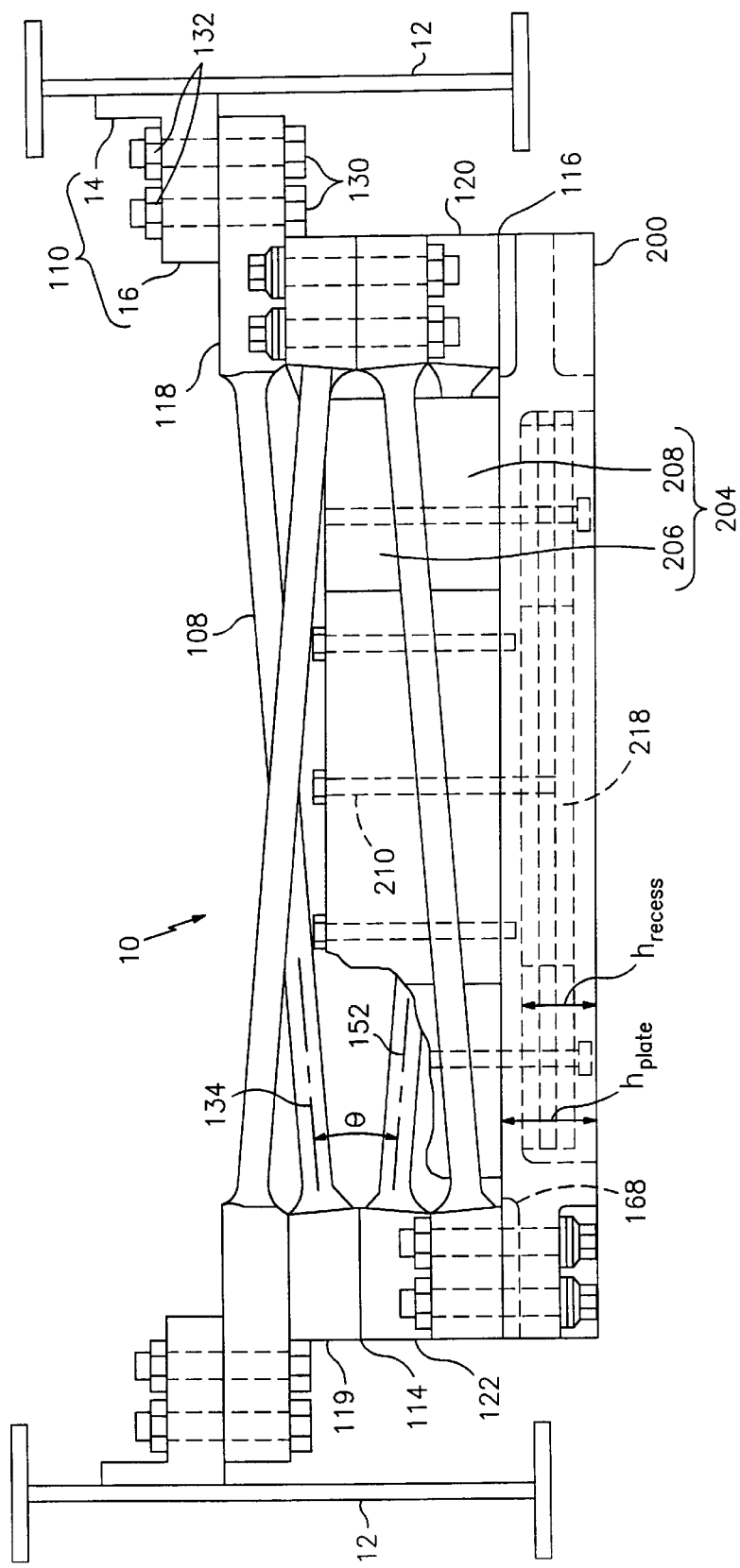
FIG. 3 is a side view, partly broken away, of the spring-mass vibration absorber of FIG. 1, depicted in combination with a supporting structure.

FIGS. 1, 2, and 3 depict a spring-mass vibration absorber 10 for absorbing vibration in a structure 12 embodying features of the present invention. The vibration absorber 10 comprises a plurality of recurved springs 100, longitudinally disposed substantially in parallel, and functionally connecting a baseplate 200 to the structure 12. In the described embodiment, the plurality of recurved springs 100 comprises an intermediate recurved spring 102 interposed between two outboard recurved springs 104, 106. As will be more fully discussed below, the intermediate recurved spring 102 and the two outboard recurved springs 104, 106, are configured in a similar manner such that the configuration of each of the recurved springs 100 can be described by way of example using the intermediate recurved spring 102.

Referring to FIGS. 1, 2, 3, 8, and 9, the intermediate recurved spring 102 comprises a first spring element 108 connected to the structure 12 at a structure connection point 110, and a second spring element 112 connected to the first spring element 108 at a spring element connection point 114 and to the baseplate 200 at a baseplate connection point 116. The first spring element 108 comprises a first end 118 fixedly connected to the structure 12 at the structure connection point 110, a second end 119 connected to the second spring element 112 at the spring element connection point 114, and a medial region 126 disposed therebetween. The second spring element 112 comprises a first end 120 fixedly connected to the baseplate 200 at the baseplate connection point 116, a second end 122 connected to the first spring element 108 at the spring element connection point 114, and a medial region 128 disposed therebetween.

The structure connection point 110 comprises a fitting 14 fixedly connected to the structure 12 and having a flange 16 with a plurality of apertures (not shown) formed therein. The first end 118 of the first spring element 108 has a corresponding plurality of apertures 199 formed therein, wherein a plurality of bolts 130 is provided for insertion through the apertures 199 in the first end 118 and the flange 16, and wherein a plurality of nuts 132 is provided for securing the bolts 130, thereby fixedly connecting the first end 118 of the first spring element 108 to the structure 12. In the described embodiment, the fitting 14 is formed from metal and is welded to the structure 12. In alternative embodiments, the fitting 14 can be formed from any material capable of supporting the vibration absorber 10 during operation, and can be integrally formed as part of the structure 12 or fixedly connected to the structure using bolts, rivets, adhesives, or any other means known in the art for fixedly connecting fittings to structures.

Referring to FIG. 4, the first spring element 108 defines a first plane 134 extending longitudinally from the first end 118 to the second end 119 and bisects a thickness dimension $t_1$ for the medial region 126. In addition, the first spring element 108 defines a first reference plane 136 extending longitudinally from an upper surface 138 of the first end 118. In the described embodiment, the first plane 134 is disposed at a first angle $\alpha_1$ relative to the first reference plane 136 such that the first and second ends 118, 119 are angled relative to the medial region 126. Specifically, in the described embodiment, the first angle $\alpha_1$ equals 4.7°.

Referring to FIGS. 1, 3, and 5, the first end 120 of the second spring element 112 is fixedly connected to a first surface 202 of the baseplate 200 at the baseplate connection point 116 with a plurality of bolts 144. In the described embodiment, the second end 119 of the first spring element 108 and the second end 122 of the second spring element 112 are fixedly connected at the spring element connection point 114 with a plurality of bolts 148 as well.

Similar to the first spring element 108, the second spring element 112 defines a second plane 152 extending longitudinally from the first end 120 to the second end 122 and bisects a thickness dimension $t_2$ for the medial region 128. In addition, the second spring element 112 defines a second reference plane 154 extending longitudinally from a lower surface 156 of the first end 120 and disposed substantially parallel to the first reference plane 136. In the described embodiment, the second plane 152 is disposed at a second angle $\alpha_2$ relative to the second reference plane 154 and is disposed at a baseplate angle β relative to the first surface 202 of the baseplate 200. The disposition of the second plane 152 is such that the first and second ends 120, 122 are angled relative to the medial region 128. In the described embodiment, the lower surface 156 of the first end 120 substantially corresponds to the first surface 202 of the baseplate 200 such that the second angle $\alpha_2$ equals the baseplate angle β, and has a value of 4.7°.

It will be appreciated that since in the described embodiment the first plane 134 is disposed at the first angle $\alpha_1$ relative to the first reference plane 136, and the second plane 152 is disposed at the second angle $\alpha_2$ relative to the second reference plane 154, and since the first and second reference planes 136, 154 are substantially parallel, then it follows that the first plane 134 is disposed at an angle θ relative to the second plane 152. It will also be appreciated that the magnitude of the angle θ can be ascertained by summing the magnitudes of the first angle a, and the second angle $\alpha_2$. Therefore, in the described embodiment, the angle 0 between the first plane 134 and the second plane 152 equals 9.4°.

The angles θ and β are selected such that clearance is provided between the second end 122 of the second spring element 112 and the baseplate 200, and between the first end 118 of the first spring element 108 and the first end 120 of the second spring element 112. Additional clearance is provided between the second end 122 of the second spring element 112 and the baseplate 200 by forming a cut-out 168 in the first surface 202 of the baseplate having a depth corresponding to the additional clearance required. These clearances ensure that when the vibration absorber 10 is in operation, the second end 122 of the second spring element 112 will not make contact with the baseplate 200, and the first end 118 of the first spring element 108 will not make contact with the first end 120 of the second spring element 112, thereby facilitating proper operation of the vibration absorber 10.

Although in the described embodiment, the angle θ between the first plane 134 and the second plane 152 equals 9.4°, this value for the angle θ was selected to address performance objectives unique to the described embodiment. In alternative embodiments, the angle θ between the first plane 134 and the second plane 152, and the baseplate angle β, may differ from the values in the described embodiment in order to address vibration absorber performance objectives unique to a particular installation. Among the factors that can influence the values for these angles are the vibratory frequencies of the attached structure, the physical size restraints for the vibration absorber, the materials utilized in the manufacture of the vibration absorber, and the desired reduction in the structure's vibratory response levels. It will be appreciated that since the angles θ and β can differ from their values in the described embodiment, it follows that the angles $\alpha_1$ and $\alpha_2$ can also differ from their values in the described embodiment. In addition, in alternative embodiments, the magnitude of the angle a, can differ from both $\alpha_2$ and β, and the magnitude of $\alpha_2$ can differ from β.

Figure 6:
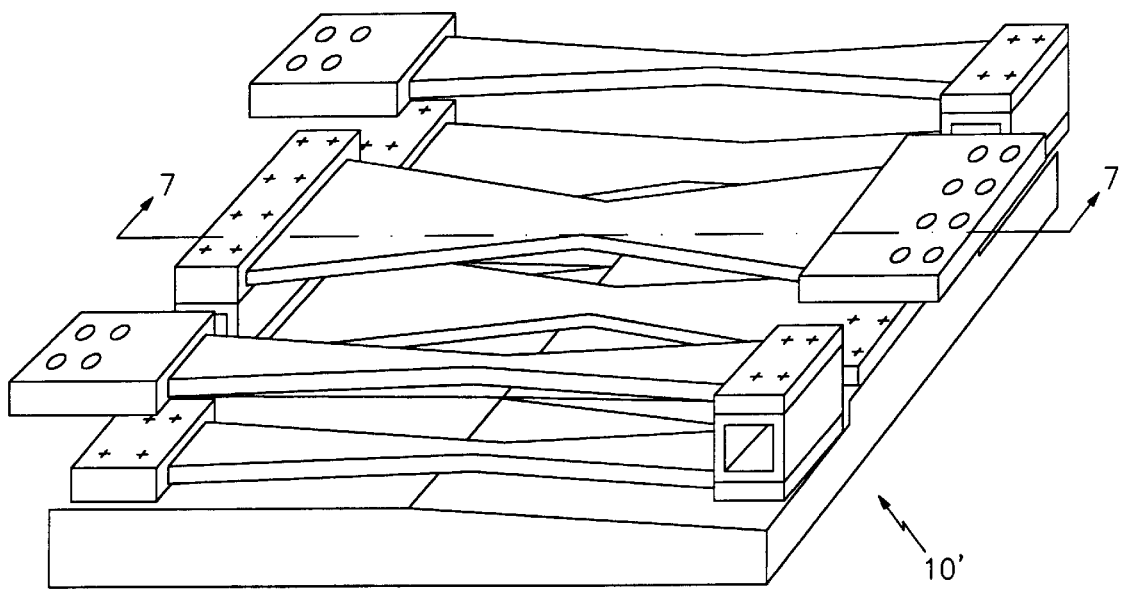
FIG. 6 is an isolated perspective view of an alternative embodiment of the springmass vibration absorber.
Figure 7:
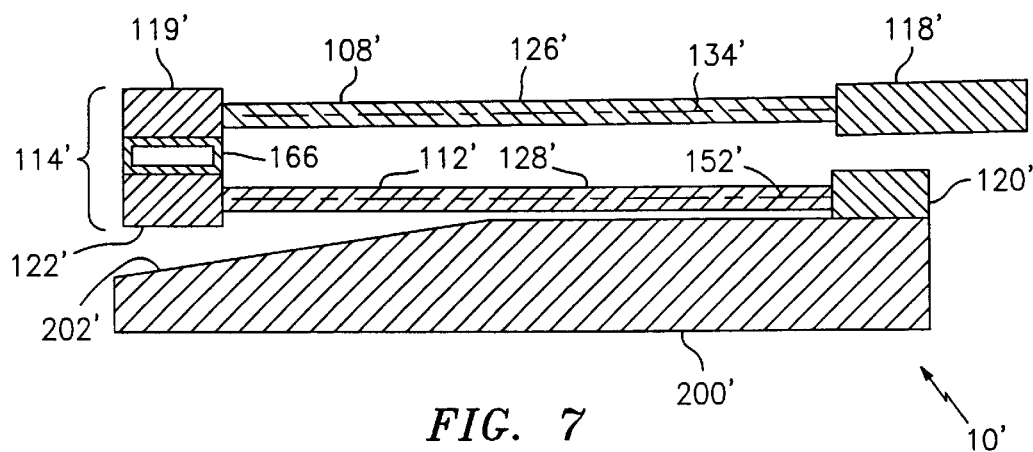
FIG. 7 is a cross-sectional view of the alternative embodiment spring-mass vibration absorber taken along the line 7—7 of FIG. 6.

In an alternative embodiment of the vibration absorber 10', as depicted in FIGS. 6 and 7, a spacer element 166 is utilized at the spring element connection point 114' for providing the clearance between the first end 118' of the first spring element 108' and the first end 120' of the second spring element 112'. In this embodiment, the first spring element 108' and the second spring element 112' are configured such that the first plane 134' and the second plane 152' are substantially parallel. Since the spacer element 166 provides the clearance between the first end 118' of the first spring element 108' and the first end 120' of the second spring element 112', it is unnecessary for the second ends 119', 122' to be angled relative to their respective medial regions 126', 128'. In addition, in this embodiment, the first end 120' of the second spring element 112' is also not angled relative to its respective medial region 128', and therefore the first surface 202' of the baseplate 200' is tapered such that there is clearance between the second end 122' of the second spring element 112' and the baseplate 200'.

In other alternative embodiments, the first spring element 108 and the second spring element 112 may be welded together at the spring element connection point 114, or connected together with rivets, adhesives, clamps, or any other means known in the art for connecting two members together. In addition, the first spring element 108 and the second spring element 112 may be integrally formed such that they comprise one member that is recurved at the spring element connection point 114. In yet other alternative embodiments, each of the spring elements 108, 112 can be configured such that they can be used with or without the spacer elements 166.

In the described embodiment, the use of the intermediate recurved spring 102 comprising the two spring elements 108, 112 bolted together, as opposed to the alternative single member configuration, provides for reduced manufacturing and replacement costs. An advantage of the described embodiment over the alternative embodiment utilizing the spacer element 166 is that the total number of parts required is reduced. In addition, in the described embodiment, the first and second spring elements 108, 112 are formed from titanium. However, in alternative embodiments, the first and second spring elements 108, 112 may be formed from any metals, composites, plastics, or any other materials, or combination of materials, capable of assuming the spring characteristics required for the vibration absorber 10.

Figure 8:
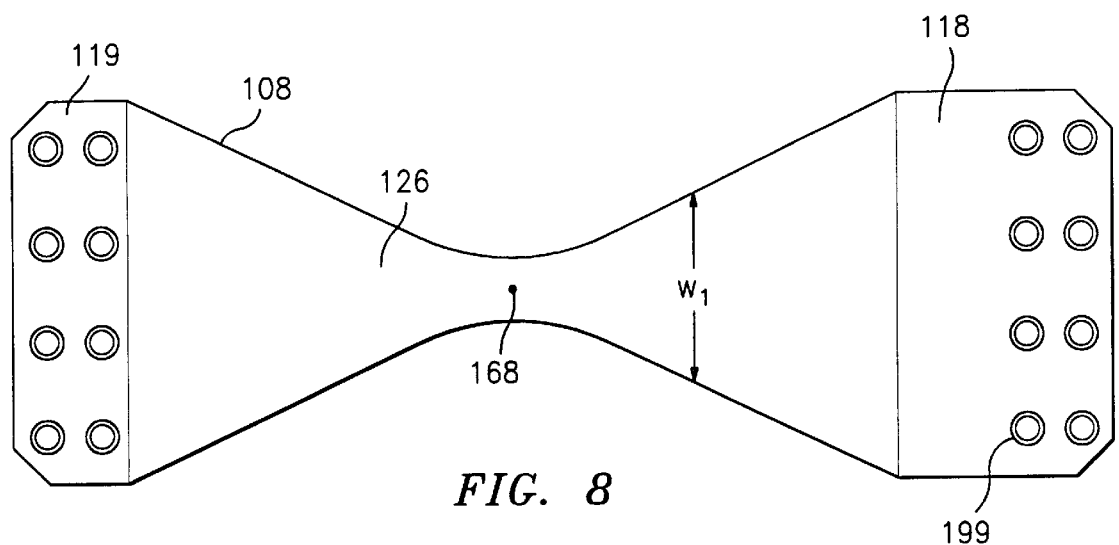
FIG. 8 is a plan view of the first spring element depicted in FIG. 1.
Figure 9:
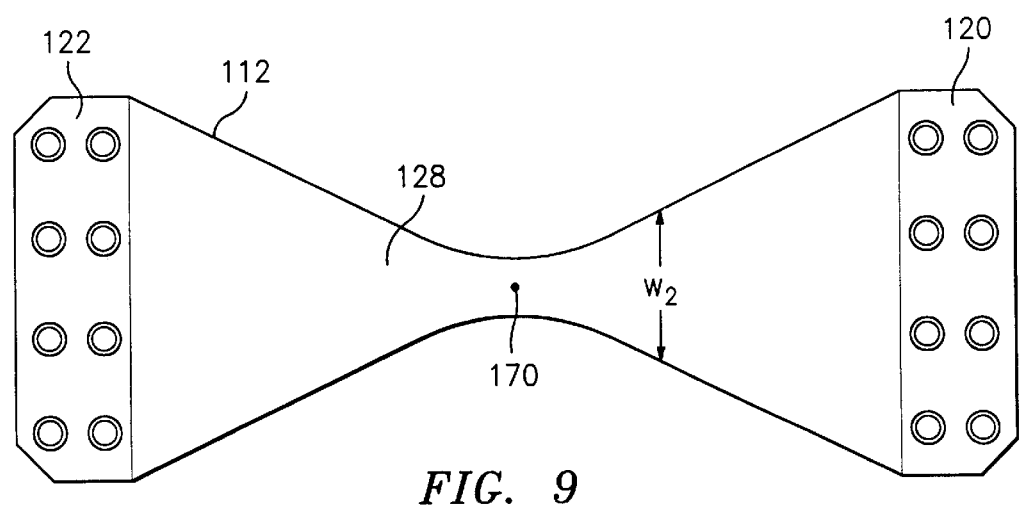
FIG. 9 is a plan view of the second spring element depicted in FIG. 1.

Referring to FIGS. 8, and 9, in the described embodiment, the first and second spring elements 108, 112 each comprise a dual tapered (or "bow-tie") configuration. As depicted in FIG. 8, the first spring element 108 defines a lateral width dimension w, having a maximum value at the first and second ends 118, 119, respectively, and a minimum value at a centroid 168 disposed in the medial region 126. Similarly, as depicted in FIG. 9, the second spring element 112 defines a lateral width dimension $w_2$ having a maximum value at the first and second ends 120, 122, respectively, and a minimum value at a centroid 170 disposed in the medial region 128.

The dual-tapered configuration facilitates a reduction in weight for each of the spring elements 108, 112, while not substantially weakening the structural integrity of the first and second spring elements 108, 122. Since the first and second spring elements 108, 112 are fixedly connected at their first ends 118, 120 and second ends 119, 122, respectively, it will be appreciated that the first and second spring elements 108, 112 react all moments at their first ends 118, 120 and second ends 119, 122. Therefore, there are no moments acting at the centroids 168, 170 of the first and second spring elements 108, 112 when the vibration absorber 10 is in operation, thereby making it possible to have a relatively narrow lateral width dimensions $w_1$, $w_2$ proximal to the centroids 168, 170. It will be appreciated that the dimensions associated with the dual-tapered configuration are dictated by factors including, but not limited to, the materials utilized, the length, widths, and thickness of the first and second spring elements 108, 112, and the nature and magnitude of the forces exerted upon the first and second spring elements 108, 112.

As described above, and as depicted in FIGS. 1, 2, and 3, the plurality of recurved springs 100 comprises the intermediate recurved spring 102 interposed between the two outboard recurved springs 104, 106. While the intermediate recurved spring 102 has been described in detail, it will be appreciated that the outboard recurved springs 104, 106 are similarly configured. Specifically, each of the outboard recurved springs 104, 106 comprises first spring elements 172, 174 and second spring elements 176, 178, wherein plurality of bolts 210. In alternative embodiments, the supplemental mass 204 can be formed from a single plate or a plurality of plates or sections, can be formed from a variety of metals or other materials, and can be disposed in the entire volume of space 196 or any portion thereof. In addition, as depicted in FIGS. 1 and 2, another supplemental mass 212 is disposed in a second volume of space 214 defined by the intermediate recurved spring 102 and the other outboard recurved spring 106.

Figure 10:
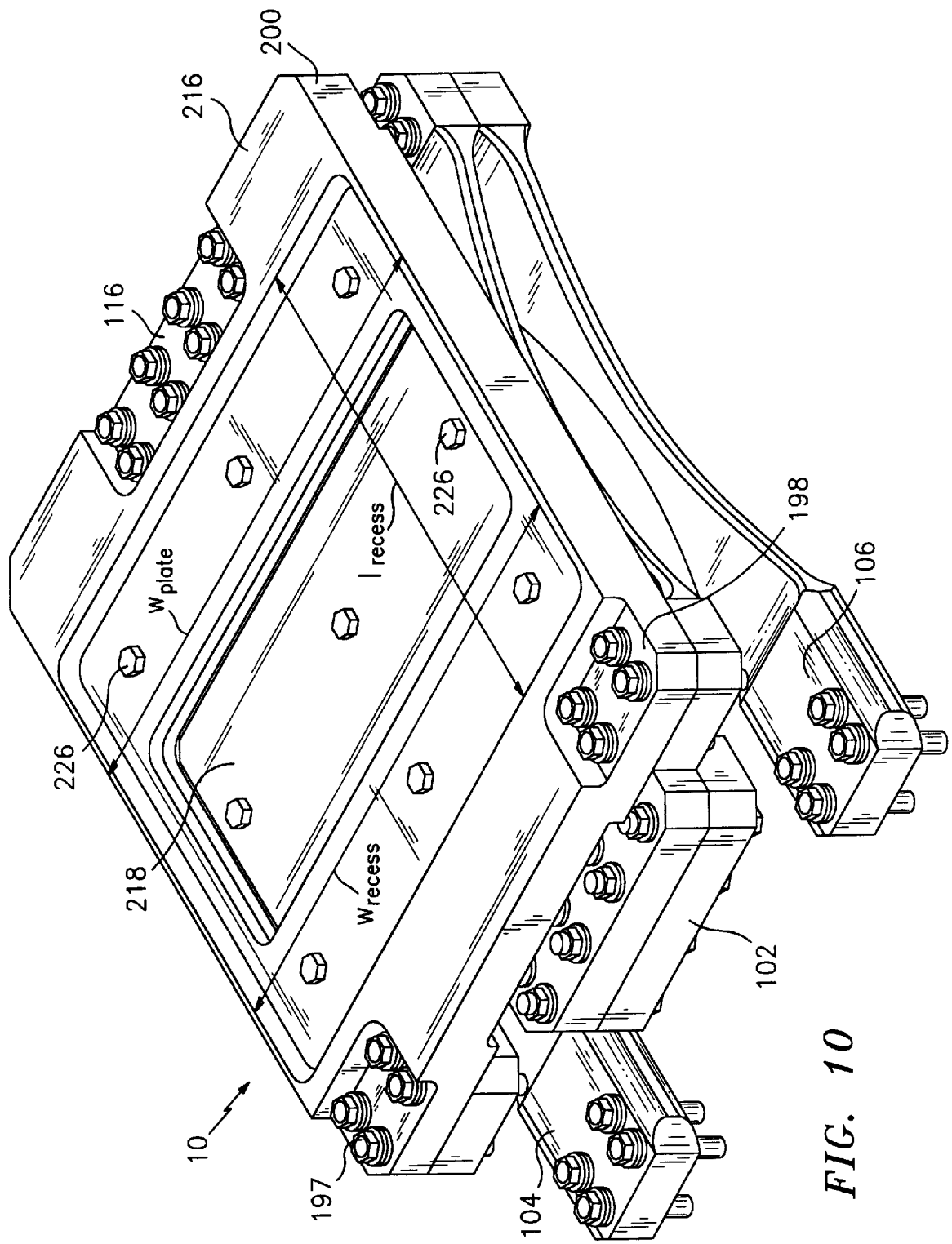
FIG. 10 is an isolated perspective view of the bottom side of the spring-mass vibration absorber depicted in FIG. 1.

Referring to FIGS. 1, 3, and 10, a second surface 216 of the baseplate 200 is depicted having a recess 218 formed therein. In a described embodiment, as depicted in FIGS. 3 and 10, the recess 218 defines a length dimension $1_{recess}$ substantially spanning a longitudinal distance from the baseplate connection point 116 for the intermediate recurved spring 102 to baseplate connection points 197, 198 for the outboard recurved springs 104, 106. Additionally, the recess 218 defines a width dimension $w_{recess}$ substantially equal to a width dimension $w_{plate}$ for the baseplate 200, and a height dimension $h_{recess}$ substantially equal to three-quarters of a height dimension $h_{plate}$ for the is baseplate 200.

The product of the length dimension $1_{recess}$, width dimension $w_{recess}$, and height dimension $h_{recess}$ for the recess 218 defines a volume of displaced baseplate mass. Specifically, the volume of displaced baseplate mass is a volume of baseplate material removed from a theoretical baseplate without a recess, in order to form the actual baseplate 200 with the recess 218. In the described embodiment, the combined predetermined weight of the supplemental masses 204, 212 is equal to the weight of the displaced baseplate mass. Therefore, in the described embodiment, the combined predetermined weight of the supplemental masses 204, 212 offsets a reduction in baseplate weight between the theoretical baseplate without a recess and the actual baseplate 200 with the recess 218, thereby substantially providing the proper total weight for the baseplate 200 needed to tune the vibration absorber 10 to the desired frequency.

In alternative embodiments, it is not necessary for the predetermined weight of the supplemental masses 204, 212 to equal the weight of the displaced baseplate mass. Depending on the operational requirements of the vibration absorber 10, the predetermined weight of the supplemental masses 204, 212 can be greater or less than the displaced baseplate mass. The size of the recess 218 and the magnitude of the combined these spring elements 172, 174, 176, 178 are connected to the structure 12 and the baseplate 200 in a manner substantially similar to that of the intermediate recurved spring 102. However, there are some notable differences between the intermediate recurved spring 102 and the outboard recurved springs 104, 106.

One difference is that in the described embodiment, the intermediate recurved spring 102 is configured such that it functions in a manner equivalent to the function of the outboard recurved springs 104, 106 combined. Another difference between the intermediate recurved spring 102 and the outboard recurved springs 104, 106 is that the outboard recurved springs 104, 106 are orientated opposite to the intermediate recurved spring 102. Specifically, the first ends 118, 120 of the intermediate recurved spring 102 are proximal to second ends 180, 182, 184, 186 of the outboard recurved springs 104, 106, and the second ends 119, 122 of the intermediate recurved spring 102 are proximal to first ends 188, 190, 192, 194 of the outboard recurved springs 104, 106.

Directing attention to the intermediate recurved spring 102 and one of the outboard recurved springs 104, these recurved springs 102, 104 are disposed substantially in parallel such that the dual-tapered configuration of their respective first and second spring elements 108, 112, 172, 176 defines a volume of space 196 interposed therebetween, and bounded on one side by the first surface 202 of the baseplate 200. It will be appreciated that the magnitude of the volume of space 196 is a function of the spacing between the recurved springs 102, 104, the extent of taper in the first and second spring elements 108, 112, 172, 176, and the distance between the first surface 202 of the baseplate 200 and a predetermined upper boundary (not shown) spaced opposite from the first surface 202, wherein the predetermined upper boundary is predetermined by any obstructing structures spaced opposite from the first surface 202 of the baseplate 200.

In the described embodiment, as depicted in FIGS. 1, 2, and 3, a supplemental mass 204 is disposed in combination with the first surface 202 of the baseplate 200 such that the supplemental mass 204 is disposed in at least a portion of the volume of space 196. The supplemental mass 204 has a predetermined weight for supplementing the overall weight of the baseplate 200 to an extent necessary to enable the vibration absorber 10 to vibrate at a desired natural frequency. The supplemental mass 204 is formed from two steel plates 206, 208, and is connected to the baseplate 200 with a predetermined weight for the supplemental masses 204, 212 should be selected, in combination, such that they create a total weight for the baseplate 200 substantially equal to the desired weight required to tune the vibration absorber 10. An advantage of utilizing the supplemental masses 204, 212 is that the addition of the masses 204, 212 shifts the center of gravity for the vibration absorber 10 away from the baseplate 200 and toward the recurved springs 102, 104, 106. This shifting in the center of gravity is advantageous because during operation of the vibration absorber 10, the proximal location of the center of gravity to the recurved springs 102, 104, 106 causes a reduction in moments that could otherwise cause detrimental twisting or rocking motions in the baseplate 200.

Figure 11:
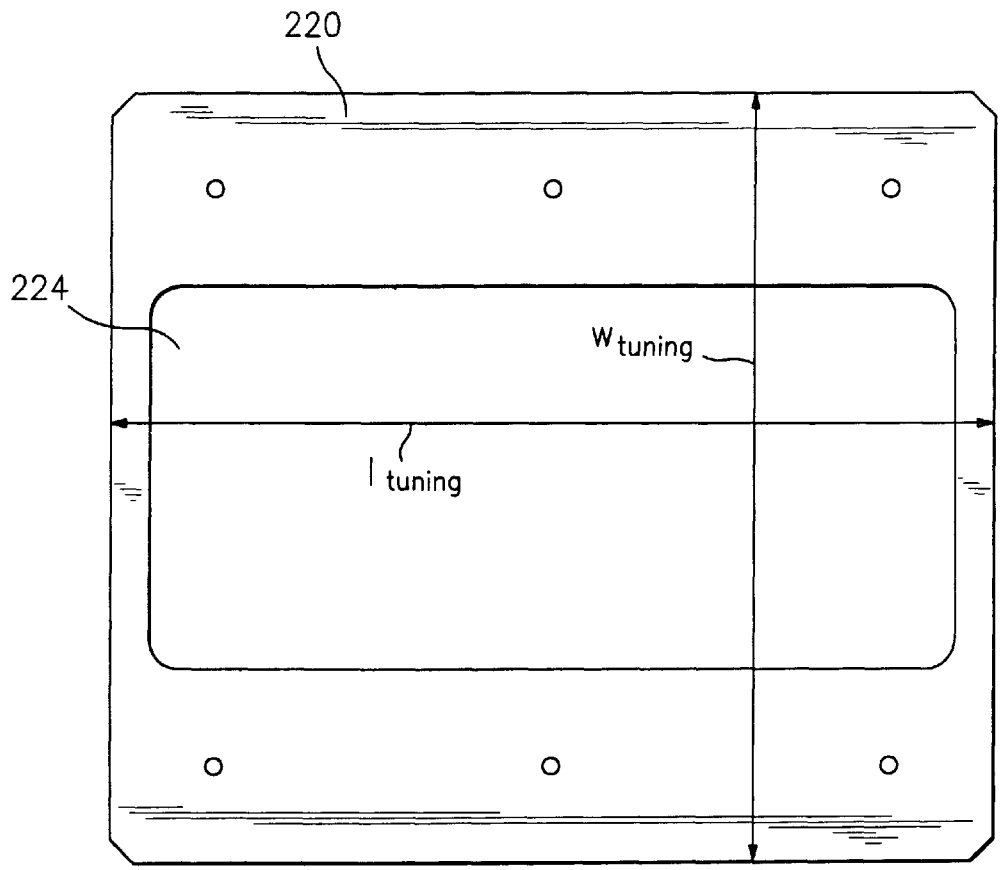
FIG. 11 is plan view of the large tuning plate depicted in FIG. 10.
Figure 12:
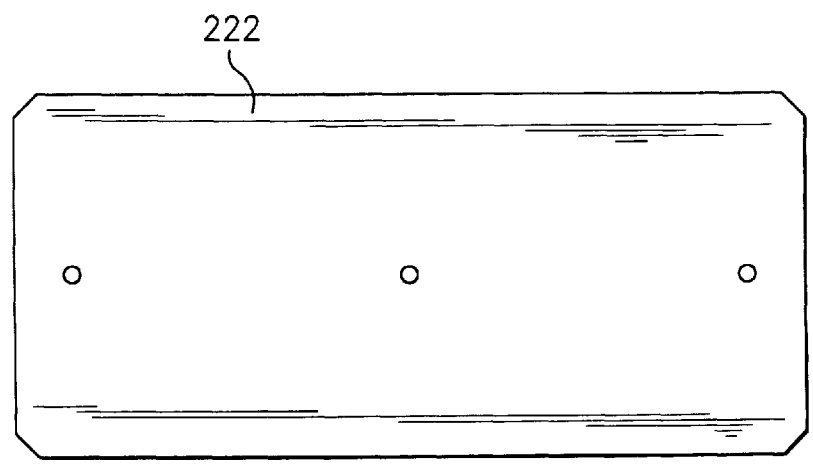
FIG. 12 is a plan view of the small tuning plate depicted in FIG. I0.

It will be appreciated that although the baseplate 200 and the supplemental masses 204, 212 are configured such that the total weight for the baseplate 200 substantially equals the desired weight necessary to tune the vibration absorber 10, it sometimes becomes necessary to dispose tuning masses in combination with the baseplate 200 in order to achieve fine tuning. In the described embodiment, as depicted in 15 FIGS. 10, 11, and 12, large tuning plates 220 and small tuning plates 222 are provided for use as the tuning masses. The large tuning plates 220 are sized such that they have a length dimension $l_{tuning}$ and a width dimension $w_{tuning}$ substantially equal to the length dimension $l_{recess}$ and width dimension $w_{recess}$ for the recess 218. In addition, the large tuning plates 220 have an opening 224 formed therein such that the large tuning plates 220 have a "frame" shape. The small tuning plates 222 comprise a rectangular shape, and are sized such that they can be disposed within the opening 224 in the large tuning plate 220. In the described embodiment, the large and small tuning plates 220, 222 are secured within the recess 218 with a plurality of bolts 226.

In addition, in the described embodiment, the large tuning plates 220 have a predetermined weight greater than a predetermined weight for the small tuning plates 222. Therefore, the small tuning plates 222 can be used for finer tuning adjustments as compared to the large tuning plates 220. An advantage of the configuration of the large tuning plates 220 and the small tuning plates 222 is that these plates 220, 222 are disposed in parallel, thereby reducing a vertical "footprint" for the plates 220, 222, while also increasing accessibility to both the large and small tuning plates 220, 222 individually.

Specifically, the prior art tuning weights are stacked in series, thereby increasing the vertical "footprint" for the stack each time a heavy or light plate is added to the stack. In contrast, the large and small tuning plates 220, 222 of the present invention are stacked in parallel such that the large tuning plates 220 and the small tuning plates 222 are separately stacked. An advantage of this parallel arrangement is that both the large and small tuning plates 220, 222 are readily accessible, thereby facilitating convenient addition or removal of single and multiple large or small tuning plates 220, 222. Another advantage of the parallel arrangement of the present invention is a more efficient use of the space in the recess 218 and proximal thereto, such that there is a reduction in the vertical "footprint" for the stack-up of tuning plates 220, 222. In the described embodiment, the small tuning plates 222 have a relatively small thickness dimension as compared to the large tuning plates 220 such that it would take a stack-up of multiple small tuning plates 222 to equal the thickness dimension of one large tuning plate 220. Therefore, for every large tuning plate 220 disposed within the recess 218, it takes a significant stack-up of small tuning plates 222 for the overall vertical "footprint"

for the small tuning plates 22 to exceed the vertical "footprint" for the large tuning plate 220. Once again, this is in contrast with the prior art arrangements wherein the addition of only one light tuning weight to a heavy tuning weight already on the stack would increase the vertical "footprint" for the entire stack. Depending upon the operational requirements for the vibration absorber 10 and the layout of the surrounding area, a reduction in the vertical "footprint" of the tuning weights can be a significant factor in preventing contact between the vibration absorber 10 and surrounding structures or components (not shown).

While in the described embodiment, the baseplate 200 is located below the recurved springs 102, 104, 106, in alternative embodiments of the present invention, the baseplate can be located above the recurved springs or interposed between two sets of recurved springs. In other alternative embodiments, the number of recurved springs can differ from the three recurved springs 102, 104, 106 of the present invention (e.g., 4 or 5 recurved springs). In yet other alternative embodiments, the recurved springs 102, 104, 106 of the present invention can be used in combination with conventional baseplates, and alternatively, the baseplate 200 of the present invention can be used in combination with spring assemblies other than recurved springs (e.g. coil springs, cantilever springs).

It will be readily seen by one of ordinary skill in the art that the present invention fulfills all the objects set forth above. After reading the foregoing specification, one of ordinary skill will be able to effect various changes, substitutions of equivalents and various other aspects of the invention as broadly disclosed herein. It is therefore intended that the protection granted hereon be limited by the definition contained in the appended claims and equivalents thereof.

What is claimed is:

1. A spring-mass vibration absorber for absorbing vibration in a structure, comprising:
   (a) a baseplate having a first surface and a second surface; and
   (b) a plurality of recurved springs adapted for connecting said baseplate to said structure, each of said recurved springs being fixedly connected to said first surface of said baseplate at a baseplate connection point, and adapted for fixed connection to said structure at a structure connection point.

2. The vibration absorber of claim 1, wherein said second surface has a recess formed therein, and wherein said vibration absorber further comprises at least one tuning mass disposed within said recess.

3. The vibration absorber of claim 2, wherein said at least one tuning mass comprises a large plate having a predetermined weight, said large plate having an opening formed therein.

4. The vibration absorber of claim 3, wherein said at least one tuning mass further comprises a small plate having a predetermined weight less than said predetermined weight of said large plate, said small plate being sized such that said small plate is disposed within said opening in said large plate.

5. The vibration absorber of claim 1, wherein: each of said recurved springs comprises a first spring element extending from said structure connection point and a second spring element extending from said baseplate connection point, said first and said second spring elements converging at a spring element connection point, said first spring element having a first end corresponding to said structure connection point and a second end corresponding to said spring element connection point, said second spring element having a first end corresponding to said baseplate connection point and a second end corresponding to said spring element connection point, said first spring element being disposed longitudinally in a first plane, and said second spring element being disposed longitudinally in a second plane.

6. The vibration absorber of claim 5, wherein said second end of said first spring element is fixedly connected directly to said second end of said second spring element at said spring element connection point, and wherein said first and said second spring elements are oriented such that said first plane is disposed at an angle relative to said second plane.

7. The vibration absorber of claim 5, wherein said second end of said first spring element and said second end of said second spring element are fixedly connected to a spacer element disposed therebetween, and wherein said first and said second spring elements are oriented such that said first plane is substantially parallel to said second plane.

8. The vibration absorber of claim 5, wherein said first and said second spring elements each comprises a dual-tapered configuration, wherein a lateral width dimension for said first spring element and a lateral width dimension for said second spring element each have a maximum value at said first and said second ends, respectively, and a minimum value at a center portion of said first and said second spring elements.

9. The vibration absorber of claim 8, wherein at least two of said plurality of recurved springs are disposed substantially in parallel such that said dual-tapered configuration of said first and said second spring elements defines a volume of space interposed between said substantially parallel recurved springs, and wherein said vibration absorber further comprises a supplemental mass disposed within said volume of space and connected to said first surface of said baseplate.

10. A spring-mass vibration absorber for absorbing vibration in a structure, comprising:
   (a) a baseplate having a first surface and a second surface, said second surface having a recess formed therein defining a volume of displaced baseplate mass having a weight;
   (b) at least one tuning mass disposed within said recess;
   (c) a spring assembly adapted for connecting said first surface of said baseplate to said structure; and
   (d) a supplemental mass connected to said first surface of said baseplate, said supplemental mass having a predetermined weight substantially equal to said weight of said displaced baseplate mass.

11. The vibration absorber of claim 10, wherein said spring assembly comprises a plurality of recurved springs, each of said recurved springs being fixedly connected to said first surface of said baseplate at a baseplate connection point, and fixedly connected to said structure at a structure connection point.

12. The vibration absorber of claim 10, wherein said at least one tuning mass comprises a large plate having a predetermined weight, said large plate having an opening formed therein.

13. The vibration absorber of claim 12, wherein said at least one tuning mass further comprises a small plate having a predetermined weight less than said predetermined weight of said large plate, said small plate being sized such that said small plate is disposed within said opening in said large plate.

14. The vibration absorber of claim 11, wherein: each of said recurved springs comprises a first spring element extending from said structure connection point and a second spring element extending from said baseplate connection point, said first and said second spring elements converging at a spring element connection point, said first spring element having a first end corresponding to said structure connection point and a second end corresponding to said spring element connection point, said second spring element having a first end corresponding to said baseplate connection point and a second end corresponding to said spring element connection point, said first spring element defining a first plane, and said second spring element defining a second plane.

15. The vibration absorber of claim 14, wherein said second end of said first spring element is fixedly connected directly to said second end of said second spring element at said spring element connection point, and wherein said first and second spring elements are oriented such that said first plane is disposed at an angle relative to said second plane.

16. The vibration absorber of claim 14, wherein said second end of said first spring element and said second end of said second spring element are fixedly connected to a spacer element disposed therebetween, and wherein said first and said second spring elements are oriented such that said first plane is substantially parallel to said second plane.

17. The vibration absorber of claim 14, wherein said first spring element and said second spring element each comprises a dual-tapered configuration, wherein a lateral width dimension for said first spring element and a lateral width dimension for said second spring element each have a maximum value at said first and said second ends, respectively, and a minimum value at a center portion of said first and said second spring elements.

18. The vibration absorber of claim 17, wherein at least two of said plurality of recurved springs are disposed substantially in parallel such that said dual-tapered configuration of said first and said second spring elements defines a volume of space interposed between said substantially parallel recurved springs, and wherein said supplemental mass is disposed within said volume of space.

19. A spring-mass vibration absorber for absorbing vibration in a structure, comprising:

(a) a baseplate having a first surface and a second surface, said second surface having a recess formed therein defining a volume of displaced baseplate mass having a weight;

(b) at least one tuning mass disposed within said recess;

(c) a supplemental mass connected to said first surface of said baseplate, said supplemental mass having a predetermined weight substantially equal to said weight of said displaced baseplate mass, and (d) a plurality of recurved springs adapted for connecting said baseplate to said structure, each of said recurved springs being fixedly connected to said first surface of said baseplate at a baseplate connection point, and adapted for fixed connection to said structure at a structure connection point.

* * * * *